(12) United States Patent
Shpiner et al.

(10) Patent No.: US 10,200,294 B2
(45) Date of Patent: Feb. 5, 2019

(54) ADAPTIVE ROUTING BASED ON FLOW-CONTROL CREDITS

(71) Applicant: Mellanox Technologies TLV Ltd., Raanana (IL)

(72) Inventors: Alex Shpiner, Nesher (IL); Vladimir Zdornov, Kfar Saba (IL); Zachy Haramaty, Hemed (IL); Eitan Zahavi, Zichron Yaakov (IL)

(73) Assignee: Mellanox Technologies TLV Ltd., Raanana (IL)

(*) Notice: Subject to any disclaimer, the term of this patent is extended or adjusted under 35 U.S.C. 154(b) by 0 days.

(21) Appl. No.: 15/387,718

(22) Filed: Dec. 22, 2016

(65) Prior Publication Data
US 2018/0183720 A1 Jun. 28, 2018

(51) Int. Cl.
*H04L 12/28* (2006.01)
*H04Q 11/00* (2006.01)
*H04L 12/801* (2013.01)
*H04L 12/707* (2013.01)

(52) U.S. Cl.
CPC .............. *H04L 47/39* (2013.01); *H04L 45/24* (2013.01)

(58) Field of Classification Search
CPC .................. H04J 3/14; H04J 1/16; H04L 1/00
See application file for complete search history.

(56) References Cited

U.S. PATENT DOCUMENTS

| | | | |
|---|---|---|---|
| 4,312,064 A | 1/1982 | Bench et al. | |
| 6,115,385 A | 9/2000 | Vig | |
| 6,169,741 B1 | 1/2001 | Lemaire et al. | |
| 6,480,500 B1 | 11/2002 | Erimli et al. | |
| 6,532,211 B1 | 3/2003 | Rathonyi et al. | |
| 6,553,028 B1 | 4/2003 | Tang et al. | |
| 6,614,758 B2 | 9/2003 | Wong | |
| 6,665,297 B1 | 12/2003 | Harigochi et al. | |
| 6,775,268 B1 | 8/2004 | Wang et al. | |
| 6,795,886 B1* | 9/2004 | Nguyen ............ | G06F 15/17375 370/412 |
| 6,804,532 B1 | 10/2004 | Moon et al. | |
| 6,807,175 B1 | 10/2004 | Jennings et al. | |
| 6,831,918 B1 | 12/2004 | Kavak | |
| 6,912,604 B1 | 6/2005 | Tzeng et al. | |

(Continued)

FOREIGN PATENT DOCUMENTS

WO 2016105446 A1 6/2016

OTHER PUBLICATIONS

U.S. Appl. No. 14/970,608 office action dated Nov. 1, 2017.

(Continued)

*Primary Examiner* — Melanie Jagannathan
(74) *Attorney, Agent, or Firm* — D. Kligler IP Services Ltd.

(57) ABSTRACT

A method for network communication includes receiving in a network element a packet for forwarding to a destination node. The destination node is reachable via two or more candidate ports of the network element that are connected to respective next-hop network elements. Link-level flow-control credit notifications are received in the network element from the next-hop network elements via the respective candidate ports. An egress port is selected for the packet, from among the candidate ports, based at least on the received link-level flow-control credit notifications. The packet is forwarded toward the destination node over the selected egress port.

11 Claims, 2 Drawing Sheets

(56) References Cited

U.S. PATENT DOCUMENTS

| | | |
|---|---|---|
| 6,950,428 B1 | 9/2005 | Horst et al. |
| 7,010,607 B1 | 3/2006 | Bunton |
| 7,076,569 B1 | 7/2006 | Bailey et al. |
| 7,234,001 B2 | 6/2007 | Simpson et al. |
| 7,274,869 B1 | 9/2007 | Pan et al. |
| 7,286,535 B2 | 10/2007 | Ishikawa et al. |
| 7,676,597 B2 | 3/2010 | Kagan et al. |
| 7,746,854 B2 | 6/2010 | Ambe et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 * | 1/2014 | Terry ............... H04L 1/00 370/235 |
| 8,755,389 B1 | 6/2014 | Poutievski et al. |
| 8,774,063 B2 | 7/2014 | Beecroft |
| 8,867,356 B2 | 10/2014 | Bloch et al. |
| 8,873,567 B1 | 10/2014 | Mandal et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,548,960 B2 | 1/2017 | Haramaty et al. |
| 9,571,400 B1 | 2/2017 | Mandal et al. |
| 2001/0043564 A1 * | 11/2001 | Bloch ............ H04L 12/4604 370/230 |
| 2001/0043614 A1 | 11/2001 | Viswanadham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1 | 6/2002 | Reeves et al. |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 * | 11/2002 | Durinovic-Johri ..... H04L 45/00 370/237 |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0223453 A1 | 12/2003 | Stoler et al. |
| 2004/0024903 A1 | 2/2004 | Costatino et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 * | 1/2009 | Brownell ............ H04L 47/18 370/231 |
| 2009/0022154 A1 | 1/2009 | Kiribe et al. |
| 2009/0103534 A1 | 4/2009 | Malledant et al. |
| 2009/0119565 A1 | 5/2009 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0301646 A1 | 11/2013 | Bogdanski et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2014/0043959 A1 | 2/2014 | Owens et al. |
| 2014/0140341 A1 | 5/2014 | Bataineh et al. |
| 2014/0192646 A1 | 7/2014 | Mir et al. |
| 2014/0198636 A1 | 7/2014 | Thayalan et al. |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0124815 A1 | 5/2015 | Beliveau et al. |
| 2015/0163144 A1 | 6/2015 | Koponen et al. |
| 2015/0172070 A1 | 6/2015 | Csaszar |
| 2015/0194215 A1 | 7/2015 | Douglas et al. |
| 2015/0195204 A1 | 7/2015 | Haramaty et al. |
| 2015/0372898 A1 | 12/2015 | Haramaty et al. |
| 2015/0372916 A1 | 12/2015 | Haramaty et al. |
| 2016/0014636 A1 | 1/2016 | Bahr et al. |
| 2016/0028613 A1 | 1/2016 | Haramaty et al. |
| 2016/0080120 A1 | 3/2016 | Unger et al. |
| 2016/0080321 A1 | 3/2016 | Pan et al. |
| 2016/0182378 A1 | 6/2016 | Basavaraja et al. |

(56) References Cited

U.S. PATENT DOCUMENTS

2016/0294715 A1    10/2016  Raindel et al.
2017/0054591 A1     2/2017  Hyoudou et al.

OTHER PUBLICATIONS

U.S. Appl. No. 15/152,077 office action dated Dec. 1, 2017.
Leiserson, C E., "Fat-Trees: Universal Networks for Hardware Efficient Supercomputing", IEEE Transactions on Computers, vol. C-34, No. 10, pp. 892-901, Oct. 1985.
Ohring et al., "On Generalized Fat Trees", Proceedings of the 9th International Symposium on Parallel Processing, pp. 37-44, Santa Barbara, USA, Apr. 25-28, 1995.
Zahavi, E., "D-Mod-K Routing Providing Non-Blocking Traffic for Shift Permutations on Real Life Fat Trees", CCIT Technical Report #776, Technion—Israel Institute of Technology, Haifa, Israel, 7 pages, Aug. 2010.
Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.
Matsuoka S., "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, Jun. 21-25, 2008.
Jiang et al., "Indirect Adaptive Routing on Large Scale Interconnection Networks", 36th International Symposium on computer Architecture, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25-27, 2009.
Kim et al., "Adaptive Routing in High-Radix Clos Network", Proceedings of the 2006 ACM/IEEE Conference on Supercomputing (SC2006), Tampa, USA, 11 pages, Nov. 2006.
Infiniband Trade Association, "InfiniBandTM Architecture Specification vol. 1", Release Release 1.3, 1842 pages, Mar. 3, 2015.
Culley et al., "Marker PDU Aligned Framing for TCP Specification", IETF Network Working Group, RFC 5044, 74 pages, Oct. 2007.
Shah et al., "Direct Data Placement over Reliable Transports", IETF Network Working Group, RFC 5041, 38 pages, Oct. 2007.
Martinez et al., "Supporting fully adaptive routing in Infiniband networks", Proceedings of the International Parallel and Distributed Processing Symposium (IPDPS'03), 10 pages, Apr. 22-26, 2003.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.
Ding et al., "Level-wise scheduling algorithm for fat tree interconnection networks", Proceedings of the 2006 ACM/IEEE Conference on Supercomputing (SC 2006), 9 pages, Nov. 2006.
Levy et al., U.S. Appl. No. 15/050,480, filed Feb. 23, 2016.
Li et al., "Multicast Replication Using Dual Lookups in Large Packet-Based Switches", 2006 IET International Conference on Wireless, Mobile and Multimedia Networks, , pp. 1-3, Nov. 6-9, 2006.
Nichols et al., "Definition of the Differentiated Services Field (DS Field) in the IPv4 and IPv6 Headers", Network Working Group, RFC 2474, 20 pages, Dec. 1998.
Microsoft., "How IPv4 Multicasting Works", 22 pages, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.
IEEE 802.1Q, "IEEE Standard for Local and metropolitan area networks Virtual Bridged Local Area Networks", IEEE Computer Society, 303 pages, May 19, 2006.
Plummer, D., "An Ethernet Address Resolution Protocol," Network Working Group ,Request for Comments (RFC) 826, 10 pages, Nov. 1982.
Hinden et al., "IP Version 6 Addressing Architecture," Network Working Group ,Request for Comments (RFC) 2373, 26 pages, Jul. 1998.
Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.
Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.
Nkposong et al., "Experiences with BGP in Large Scale Data Centers:Teaching an old protocol new tricks", 44 pages, Jan. 31, 3014.
"Equal-cost multi-path routing", Wikipedia, 2 pages, Oct. 13, 2014.
Thaler et al., "Multipath Issues in Unicast and Multicast Next-Hop Selection", Network Working Group, RFC 2991, 9 pages, Nov. 2000.
Glass et al., "The turn model for adaptive routing", Journal of the ACM, vol. 41, No. 5, pp. 874-903, Sep. 1994.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.
Niowlab—Network Based Computing Lab, 2 pages, years 2002-2015 http://nowlab.cse.ohio-state.edu/publications/conf-presentations/2007/vishnu-ccgrid07.pdf.
Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modem High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
Haramaty et al., U.S. Appl. No. 14/970,608, filed Dec. 16, 2015.
Afek et al., "Sampling and Large Flow Detection in SDN", SIGCOMM '15, pp. 345-346, Aug. 17-21, 2015, London, UK.
Levy et al., U.S. Appl. No. 15/152,077, filed Nov. 5, 2016.
Dally et al., "Deadlock-Free Message Routing in Multiprocessor Interconnection Networks", IEEE Transactions on Computers, vol. C-36, No. 5, May 1987, pp. 547-553.
Zahavi et al., U.S. Appl. No. 15/218,028, filed Jul. 24, 2016.
Zahavi et al., "Distributed Adaptive Routing for Big-Data Applications Running on Data Center Networks", Proceedings of the Eighth ACM/IEEE Symposium on Architectures for Networking and Communication Systems, New York, USA, pp. 99-110, Oct. 29-30, 2012.
Lemasa et al., "Fibre Channel over Ethernet in the Data Center: An Introduction", Fiber Channel Industry Association, 8 pages, Oct. 11, 2007.
U.S. Appl. No. 14/970,608, Office Action dated May 30, 2017.
U.S. Appl. No. 14/673,892 Office Action dated Jun. 1, 2017.

(56) References Cited

OTHER PUBLICATIONS

U.S. Appl. No. 15/050,480 office action dated Jan. 22, 2018.
U.S. Appl. No. 15/356,588 office action dated Jul. 11, 2018.
U.S. Appl. No. 15/152,077 office action dated Jul. 16, 2018.
U.S. Appl. No. 15/050,480 office action dated Nov. 2, 2018.

* cited by examiner

ADAPTIVE ROUTING BASED ON FLOW-CONTROL CREDITS

FIELD OF THE INVENTION

The present invention relates generally to network communication, and particularly to methods and systems for adaptive routing of packets.

BACKGROUND OF THE INVENTION

Various techniques for multi-path routing of packets through communication networks are known in the art. Some known techniques dynamically select routing paths for packets based on the network state, e.g., traffic load and/or congestion. Such techniques are sometimes referred to as Adaptive Routing. AR techniques are described, for example, by Zahavi et al., in "Distributed Adaptive Routing for Big-Data Applications Running on Data Center Networks," Proceedings of the Eighth ACM/IEEE Symposium on Architectures for Networking and Communication Systems, New-York, New-York, 2012, pages 99-110, which is incorporated herein by reference.

Other Adaptive Routing techniques are described by Kim et al., in "Adaptive Routing in High-Radix Clos Network," Proceedings of the 2006 ACM/IEEE Conference on Supercomputing (SC2006), Tampa, Fla., November, 2006; by Jiang et al., in "Indirect Adaptive Routing on Large Scale Interconnection Networks," Proceedings of the $36^{th}$ Annual International Symposium on Computer Architecture, Austin, Tex., June, 2009, pages 220-231; and by Kim et al., in "Technology-Driven, Highly-Scalable Dragonfly Topology," Proceedings of the $35^{th}$ Annual International Symposium on Computer Architecture, June, 2008, pages 77-88, which are incorporated herein by reference.

U.S. Pat. No. 8,576,715, whose disclosure is incorporated herein by reference, describes a method for communication that includes routing a first packet, which belongs to a given packet flow, over a first routing path through a communication network. A second packet, which follows the first packet in the given packet flow, is routed using a time-bounded Adaptive Routing (AR) mode, by evaluating a time gap between the first and second packets, routing the second packet over the first routing path if the time gap does not exceed a predefined threshold, and, if the time gap exceeds the predefined threshold, selecting a second routing path through the communication network that is potentially different from the first routing path, and routing the second packet over the second routing path.

U.S. Pat. No. 9,014,006 and U.S. Patent Application Publication 2015/0195204, whose disclosures are incorporated herein by reference, describe a method including receiving in a network switch of a communication network communication traffic that originates from a source node and arrives over a route through the communication network traversing one or more preceding network switches, for forwarding to a destination node. In response to detecting in the network switch a compromised ability to forward the communication traffic to the destination node, a notification is sent to the preceding network switches. The notification is to be consumed by the preceding network switches and requests the preceding network switches to modify the route so as not to traverse the network switch.

Additional adaptive routing techniques for mitigating congestion are described by Minkenberg et al., in "Adaptive Routing in Data Center Bridges," Proceedings of the $17^{th}$ IEEE Symposium on High Performance Interconnects, August, 2009, which is incorporated herein by reference. Adaptive routing schemes for Converged Enhanced Ethernet (CEE) are described by Gusat et al., in "$R^3C^2$: Reactive Route & Rate Control for CEE," Proceedings of the $18^{th}$ IEEE Symposium on High Performance Interconnects, August, 2010, which is incorporated herein by reference.

SUMMARY OF THE INVENTION

An embodiment of the present invention that is described herein provides a method for network communication, including receiving in a network element a packet for forwarding to a destination node. The destination node is reachable via two or more candidate ports of the network element that are connected to respective next-hop network elements. Link-level flow-control credit notifications are received in the network element from the next-hop network elements via the respective candidate ports. An egress port is selected for the packet, from among the candidate ports, based at least on the received link-level flow-control credit notifications. The packet is forwarded toward the destination node over the selected egress port.

In some embodiments, selecting the egress port includes deriving, from the received link-level flow-control credit notifications, numbers of credits that are currently available on the candidate ports, and selecting the egress port based at least on the numbers of credits. In an example embodiment, selecting the egress port includes normalizing the numbers of credits by respective lengths of network links that connect the next-hop network elements to the candidate ports, and selecting the egress port based at least on the normalized numbers of credits.

In a disclosed embodiment, selecting the egress port includes calculating, based at least on the link-level flow-control credit notifications, port congestion grades for the candidate ports, and selecting the egress port based on the port congestion grades. In another embodiment, the packet is associated with a given Virtual Lane (VL), and selecting the egress port includes choosing the egress port only based on the link-level flow-control credit notifications pertaining to the given VL. In yet another embodiment, the packet is associated with a given Virtual Lane (VL), and selecting the egress port includes choosing the egress port based on (i) the link-level flow-control credit notifications pertaining to the given VL, and (ii) the link-level flow-control credit notifications pertaining to the candidate ports as a whole. In some embodiments the method includes, in addition to selecting the egress port, throttling amounts of data sent via the candidate ports based on the received link-level flow-control credit notifications.

There is additionally provided, in accordance with an embodiment of the present invention, a network element including multiple ports and circuitry. The circuitry is configured to receive a packet for forwarding to a destination node, wherein the destination node is reachable via two or more candidate ports of the network element that are connected to respective next-hop network elements, to receive link-level flow-control credit notifications from the next-hop network elements via the respective candidate ports, to select an egress port for the packet from among the candidate ports, based at least on the received link-level flow-control credit notifications, and to forward the packet toward the destination node over the selected egress port.

There is further provided, in accordance with an embodiment of the present invention, a computer software product, the product including a tangible non-transitory computer-readable medium in which program instructions are stored, which instructions, when read by a processor in a network element, cause the processor to receive a packet for forwarding to a destination node, wherein the destination node is reachable via two or more candidate ports of the network element that are connected to respective next-hop network elements, to receive link-level flow-control credit notifications from the next-hop network elements via the respective candidate ports, to select an egress port for the packet from among the candidate ports, based at least on the received link-level flow-control credit notifications, and to forward the packet toward the destination node over the selected egress port.

The present invention will be more fully understood from the following detailed description of the embodiments thereof, taken together with the drawings in which:

DETAILED DESCRIPTION OF EMBODIMENTS

Overview

Figure 1:
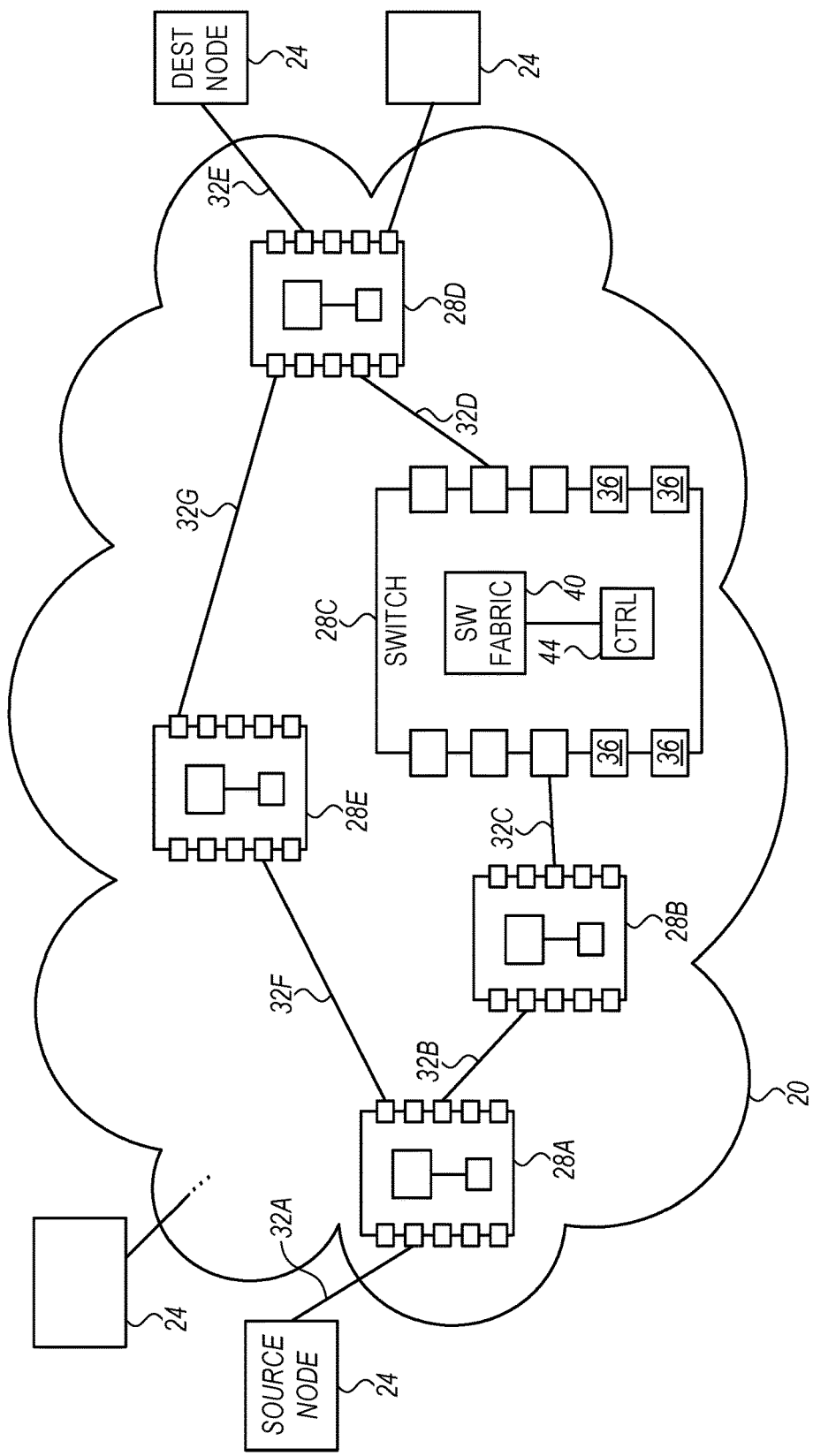
FIG. 1 is a block diagram that schematically illustrates a communication network that uses adaptive routing, in accordance with an embodiment of the present invention.

Embodiments of the present invention that are described herein provide improved methods and systems for Adaptive Routing (AR) of packets. The embodiments described herein refer mainly to network switches in an Infiniband® networks, but the disclosed techniques can also be used with various other types of network elements, and in other suitable network types.

In some embodiments, a switch receives a packet addressed to a certain destination node. The network topology is such that there are multiple possible routes from the switch to the destination node. In other words, the switch has two or more candidate ports via which the destination node is reachable. The switch takes advantage of this topology, and selects an egress port for the packet adaptively from among the candidate ports, typically aiming to avoid routing the packet over congested routes.

In various embodiments, the switch may select the egress port ("make an AR decision") based on various parameters. In the disclosed techniques, the switch makes AR decisions by taking into account the available link-level flow-control credits of the various candidate ports, as notified by the next-hop switches connected to the candidate ports.

In Infiniband, as well as in various other network types, the switches employ credit-based link-level flow control (also referred to as link-layer flow control). As such, each next-hop switch periodically notifies the switch of the buffer space it currently has available for buffering arriving data. The notification is sent in terms of available "credits." In the present context, the term "credit" refers to any quantitative measure that is indicative of the buffer space available for buffering arriving data. The amount of data that the switch is permitted to send to the next-hop switch is limited by the number of the currently-available credits.

In the disclosed embodiments, the switch regards the number of the currently-available credits of a candidate port as an indication of possible congestion in the next-hop switch. A small number of available credits may indicate that the next-hop switch is congested, or about to become congested. A large number of available credits typically indicates that the next-hop switch is free of congestion. Therefore, when making AR decisions, the switch may give higher weight to candidate ports having large numbers of available credits.

Several examples of AR selection criteria that consider the available number of credits, in combination with other parameters, are described herein. In some embodiments, the next-hop switches report available credits per Virtual Lane (VL). The switch may select the egress port for a packet by considering the numbers of available credits reported for the VL to which the packet belongs, and/or the total numbers of available credits over all VLs. A technique for normalizing the number of credits depending on the length of the link is also described.

The disclosed techniques make a highly novel use of the credit-based link-level flow control mechanism employed in the network. Conventionally, the number of available credits notified via a given port is by-definition used only within the scope of that port, for throttling the amount of data sent on that particular port. In the disclosed techniques, numbers of available credits notified via multiple ports are used collectively as part of a routing decision, for choosing over which of the ports to route a packet.

When using the disclosed techniques, the switch is able to make better AR decisions that consider possible congestion in the next-hop switches, not only local information relating to the switch itself. The disclosed techniques achieve this goal without adding any signaling overhead, since they make use of existing flow-control notifications.

System Description

FIG. 1 is a block diagram that schematically illustrates a communication network 20 that uses adaptive routing, in accordance with an embodiment of the present invention. In the present example, network 20 operates in accordance with the Infiniband® specifications. In alternative embodiments, network 20 may operate in accordance with other suitable communication standards or protocols. Typically, although not necessarily, the disclosed techniques are used with lossless network protocols.

Network 20 provides packet communication for multiple nodes 24. A node may comprise, for example, a Host Channel Adapter (HCA) or other Network Interface Controller (NIC) of a computer. Each flow of packets originates from a certain source node and is addressed to a certain destination node. The packets of the flow are forwarded over a route through the network that traverses various network elements (e.g., network switches) and network links (also referred to as hops).

For the sake of clarity, the description that follows refers mainly to switches. The disclosed techniques, however, can be used in other suitable types of network elements, such as routers.

In order to demonstrate the disclosed techniques, FIG. 1 shows a simplified example of a source node, a destination node, switches 28A . . . 28E and links 32A . . . 32G. In a real-life network, the switches may be interconnected in various topologies. Network topologies may comprise Fat-Tree (FT) or Dragonfly topologies, for example.

Each switch 28 comprises multiple ports 36 that are configured to receive and transmit packets, switch fabric circuitry 40 that is configured to forward the packets between the ports, and control circuitry 44 that controls and configures the various switch elements. Among other tasks, control circuitries 44 of the switches in network 20 carry out Adaptive Routing (AR) techniques that are described in detail below.

The description that follows refers to a certain partitioning of functions between the switch fabric circuitry and the control circuitry. In alternative embodiments, however, any other suitable functional partitioning can be used. In the context of the present patent application and in the claims, switch fabric circuitry 40 and control circuitry 44 are referred to jointly as "circuitry" that carries out the methods described herein.

The network and switch configurations shown in FIG. 1 are example configurations, which are chosen purely for the sake of conceptual clarity. In alternative embodiments, any other suitable network and/or switch configuration can be used. Certain switch elements may be implemented using hardware/firmware, such as using one or more Application-Specific Integrated Circuits (ASICs) or Field-Programmable Gate Arrays (FPGAs). Alternatively, some switch elements may be implemented in software or using a combination of hardware/firmware and software elements.

In some embodiments, certain switch functions, such as certain functions of control circuitry 44, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Adaptive Routing Based on Flow-Control Credits from Next-Hop Network Elements In some embodiments, switches 28 in network 20 employ credit-based link-level flow control on network links 32 that connect them. Credit-based link-level flow control in Infini-Band networks is specified, for example, in sections 3.7.2 and 7.9 of "Infiniband™ Architecture Specification Volume 1," Release 1.3, March, 2015, which is incorporated herein by reference.

Flow-control schemes that use credits are also described, for example, by Kung and Morris, in "Credit-Based Flow Control for ATM Networks," IEEE Network Magazine, volume 9, issue 2, March, 1995, pages 40-48, which is incorporated herein by reference.

In the context of the present patent application and in the claims, the term "link-level flow-control credit notification" refers to a notification that is received in a given switch from a next-hop switch connected to the given switch by a network link. The notification indicates credits made available on the respective network link (as opposed, for example, to end-to-end credit notifications that may also be used on the same network).

The terms "link-level flow-control credit notifications" and "link-layer flow-control credit notifications" are used interchangeably herein. The description that follows may also refer to such notifications simply as "credit notifications," for brevity. In some embodiments of the present invention, the switches in network 20 use AR selection criteria that consider credit notifications from next-hop switches.

Unlike binary flow-control indications such as Ethernet XON/XOFF commands, the number of available credits is a soft value that is represented using multiple bits and has a relatively fine resolution. Therefore, the disclosed techniques that use credit-based notifications are highly accurate in expressing the congestion state of the next-hop switch. As a result, adaptive routing decisions based on these notifications are equally accurate.

Referring again to FIG. 1, consider a flow of packets that originates in the source node on the left-hand-side of the figure, and is destined to the destination node on the right-hand-side of the figure. As can be seen in the figure, the destination node is reachable from the source node via two possible routes. One route traverses switch 28A, link 32F, switch 28E, link 32G, switch 28D, and link 32E. The other route traverses switch 28A, link 32B, switch 28B, link 32C, switch 28C, link 32D, switch 28D, and finally link 32E. Thus, switch 28A has two options for routing the packets of this flow—Either over link 32F to switch 28E, or over link 32B to switch 28B.

Figure 2:
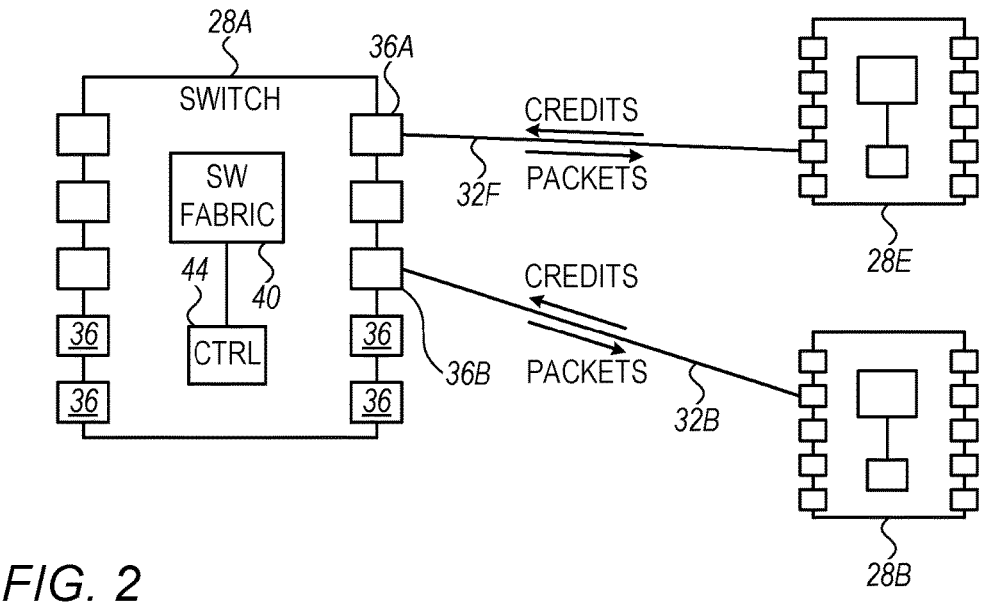
FIG. 2 is a block diagram that schematically illustrates a portion of the communication network of FIG. 1, in accordance with an embodiment of the present invention.

FIG. 2 is a block diagram that schematically illustrates a portion of network 20 of FIG. 1, in accordance with an embodiment of the present invention. The figure focuses on switch 28A. Switch 28A is connected via a port 36A to link 32F that connects to next-hop switch 28E, and via a port 36B to link 32B that connects to next-hop switch 28B.

In accordance with the credit-based link-level flow control mechanism employed in network 20, switch 28A receives credit notifications from next-hop switch 28E via port 36A, and credit notifications from next-hop switch 28B via port 36B.

As noted above, the two next-hop switches, and the corresponding ports and links, lie on two respective possible routes leading from switch 28A to the destination node. As such, in switch 28A, ports 36A and 36B are candidate ports for adaptive routing of packets destined to the destination node. In the present example the switch has two candidate ports from which to select the egress port. The disclosed techniques, however, are applicable to any number of candidate ports. The set of candidate ports are also referred to as an "AR group."

In some embodiments, in order to route a packet belonging to a flow destined to the destination node, control circuitry 44 of switch 28A evaluates an AR criterion that selects an egress port for the packet, from among the candidate ports 36A and 36B. If the selected egress port is different from the egress port that is currently defined for this flow, control circuitry 44 reconfigures fabric circuitry 40 to route the flow over the newly-selected egress port.

In some embodiments, control circuitry calculates a "port congestion grade" for each candidate port. The port congestion grade of a candidate port quantifies the extent of congestion that a packet sent over the candidate port is expected to experience.

The port congestion grade of a candidate port is defined as a function of one or more parameters of the candidate port. One of the parameters is the number of credits that are currently available for sending data over the candidate port. This number is based on the credit notifications received via the candidate port from the corresponding next-hop switch. In an embodiment, the port congestion grade depends only on the number of available credits. In other embodiments, the port congestion grade of a candidate port further depends on one or more additional parameters which may comprise, for example:

- The queue length of the candidate port, i.e., the total size of the data that is queued in switch 28A for transmission via the candidate port.
- The traffic class queue length of the candidate port, i.e., the total size of the data, which belongs to a particular traffic class (and thus associated with a particular VL) and is queued in switch 28A for transmission via the candidate port.

The bandwidth utilization of the candidate port.

Additionally or alternatively, the port congestion grade may depend on any other suitable parameter. Control circuitry 44 may evaluate any suitable function of these parameters to produce the port congestion grade, e.g., so as to give different weights to different parameters in making the AR decision. Additionally or alternatively to giving different weights, control circuitry 44 may give different priorities to different parameters in making the AR decision. For example, the control circuitry may check the queue length first, and only if the queue length is the same for two or more ports, proceed to check the number of available credits. Any other suitable prioritization can also be used.

In an embodiment, control circuitry 44 selects the candidate port having the smallest port congestion grade to serve as the egress port of the packet.

In some embodiments, control circuitry 44 may consider additional factors in selecting the egress port, in addition to the number of available credits. For example, control circuitry 44 may set a minimal time interval between changes in the egress port of a flow. In other words, control circuitry 44 may retain the currently-selected egress port of the flow (even if a different candidate port has a larger number of available credits and/or a lower port congestion grade) if the last modification of the egress port was made less than a predefined time ago.

As another example, control circuitry 44 may retain the currently-selected egress port of the flow if the previous packet of the flow was routed less than a predefined time ago. As yet another example, control circuitry 44 may limit the number of flows on any given candidate port to a predefined maximum number.

Additionally or alternatively, control circuitry 44 may select the egress port based on any other suitable criterion, in combination with the available number of credits on the candidate ports.

In some embodiments, each port of next-hop switches 28E and 28B comprises separate input buffers for different Virtual Lanes (VLs). Each port of the next-hop switches queues the incoming packets of each VL separately, and also sends credit notifications separately per VL to switch 28A. In some embodiments, for routing a packet belonging to a given VL, control circuitry 44 of switch 28A selects the egress port based on the number of available credits for that given VL, or the total number of available credits for the port as a whole, or both the number of available credits for the VL of the packet and the total number of available credits for the port.

In some practical scenarios, the physical length of the network links may distort the switch's information regarding the number of available credits. Referring to FIG. 2, for example, consider a scenario in which link 32B is considerably longer than link 32F, and therefore has a considerably larger propagation delay. At a given point in time, the number of credit notifications that are "in flight" along link 32B (reported by next-hop switch 28B but not yet received by switch 28A) is likely to be larger than the number of credit notifications that are "in flight" along link 32F (reported by next-hop switch 28E but not yet received by switch 28A).

As can be seen from this example, the number of available credits known to switch 28A may be different from the actual number of available credits reported by the next-hop switch, and the difference grows with the physical length of the link. Unless accounted for, this effect may cause the AR selection criterion to unfairly prefer short links over long links.

In some embodiments, control circuitry 44 of switch 28A compensates for the above effect by normalizing the number of available credits for a given link by the physical length of the link. The control circuitry then makes AR decisions depending on the normalized numbers of credits.

Figure 3:
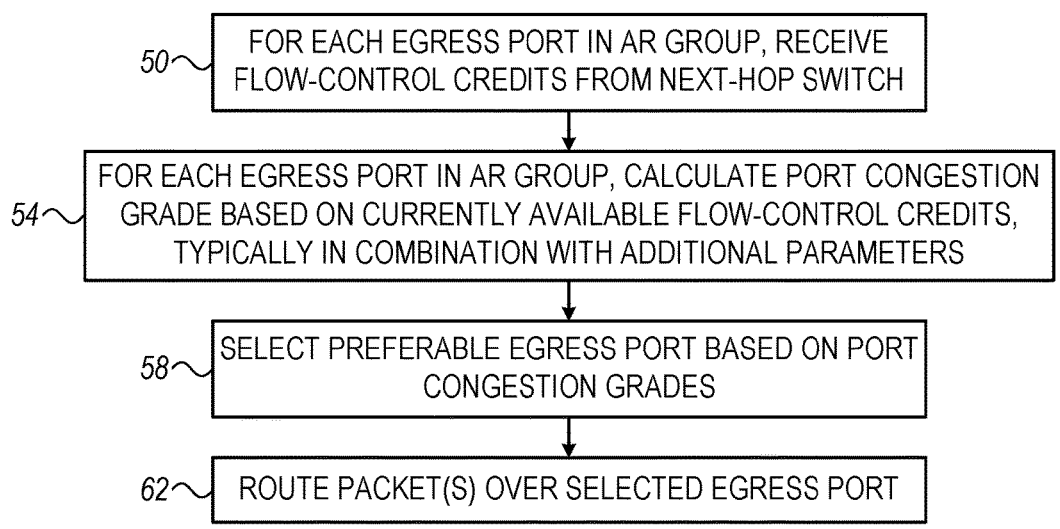
FIG. 3 is a flow chart that schematically illustrates a method for adaptive routing based on flow-control credits, in accordance with an embodiment of the present invention.

FIG. 3 is a flow chart that schematically illustrates a method for adaptive routing based on flow-control credits, in accordance with an embodiment of the present invention. The method begins with control circuitry 44 of a switch receiving, for each candidate port in the AR group, credit notifications from the corresponding next-hop switch, at a notification reception step 50.

Typically, the next-hop switch sends a credit notification when it removes a certain amount of data from the corresponding input buffer. The switch receives the credit notifications and, for each candidate port (possibly per VL), continuously derives and tracks the number of credits that are currently available.

At a congestion grade calculation step 54, control circuitry 44 of the switch calculates a port congestion grade for each candidate port in the AR group. As explained above, the port congestion grade of a candidate port depends on the number of credits that are currently available on that port (possibly per VL), possibly in combination with additional parameters.

At an AR decision step 58, control circuitry 44 selects an egress port for a packet flow based on the port congestion grades of the various candidate ports. Control circuitry 44 configures fabric circuitry 40 accordingly. The fabric circuitry then routes the packets belonging to the flow to the selected egress port, at a routing step 62. Control circuitry 44 typically repeats the process of FIG. 3 continuously.

Typically, the switch uses the same credit notifications received from the next-hop switches for two purposes—(i) for link-level flow control, i.e., for throttling the amount of data sent over each link based on the credit notifications received on that link, and (ii) for adaptive routing using the disclosed techniques.

Although the embodiments described herein mainly address Infiniband, the methods and systems described herein can also be used in other applications, such as in any network type or protocol that uses credit-based flow control, for example Ethernet or Fibre-Channel over Ethernet (FCoE). Credit-based flow control for Ethernet is addressed, for example, in U.S. Pat. No. 8,867,356, whose disclosure is incorporated herein by reference. Credit-based flow control for FCoE is addressed, for example, by Lemasa and Gai, in "Fibre Channel over Ethernet in the Data Center: An Introduction," The Fibre Channel Industry Association, 2007, which is incorporated herein by reference.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for network communication, comprising:
in a network element, receiving a packet for forwarding to a destination node, wherein the destination node is reachable via two or more candidate ports of the network element that are connected to respective next-hop network elements;
receiving in the network element link-level flow-control credit notifications from the next-hop network elements via the respective candidate ports;
selecting an egress port for the packet from among the candidate ports, based at least on the received link-level flow-control credit notifications, by:
deriving, from the received link-level flow-control credit notifications, numbers of credits that are currently available on the candidate ports;
normalizing the numbers of credits by respective lengths of network links that connect the next-hop network elements to the candidate ports; and
selecting the egress port based at least on the normalized numbers of credits; and
forwarding the packet toward the destination node over the selected egress port.

2. The method according to claim 1, wherein selecting the egress port comprises calculating, based at least on the link-level flow-control credit notifications, port congestion grades for the candidate ports, and selecting the egress port based on the port congestion grades.

3. The method according to claim 1, wherein the packet is associated with a given Virtual Lane (VL), and wherein selecting the egress port comprises choosing the egress port only based on the link-level flow-control credit notifications pertaining to the given VL.

4. The method according to claim 1, wherein the packet is associated with a given Virtual Lane (VL), and wherein selecting the egress port comprises choosing the egress port based on (i) the link-level flow-control credit notifications pertaining to the given VL, and (ii) the link-level flow-control credit notifications pertaining to the candidate ports as a whole.

5. The method according to claim 1, and comprising, in addition to selecting the egress port, throttling amounts of data sent via the candidate ports based on the received link-level flow-control credit notifications.

6. A network element, comprising:
multiple ports; and
circuitry, configured to:
receive a packet for forwarding to a destination node, wherein the destination node is reachable via two or more candidate ports of the network element that are connected to respective next-hop network elements;
receive link-level flow-control credit notifications from the next-hop network elements via the respective candidate ports;
select an egress port for the packet from among the candidate ports, based at least on the received link-level flow-control credit notifications, by:
deriving, from the received link-level flow-control credit notifications, numbers of credits that are currently available on the candidate ports;
normalizing the numbers of credits by respective lengths of network links that connect the next-hop network elements to the candidate ports; and
selecting the egress port based at least on the normalized numbers of credits; and
forward the packet toward the destination node over the selected egress port.

7. The network element according to claim 5, wherein the circuitry is configured to calculate, based at least on the link-level flow-control credit notifications, port congestion grades for the candidate ports, and to select the egress port based on the port congestion grades.

8. The network element according to claim 5, wherein the packet is associated with a given Virtual Lane (VL), and wherein the circuitry is configured to select the egress port only based on the link-level flow-control credit notifications pertaining to the given VL.

9. The network element according to claim 5, wherein the packet is associated with a given Virtual Lane (VL), and wherein the circuitry is configured to select the egress port based on (i) the link-level flow-control credit notifications pertaining to the given VL, and (ii) the link-level flow-control credit notifications pertaining to the candidate ports as a whole.

10. The network element according to claim 5, wherein, in addition to selecting the egress port, the circuitry is further configured to throttle amounts of data sent via the candidate ports based on the received link-level flow-control credit notifications.

11. A computer software product, the product comprising a tangible non-transitory computer-readable medium in which program instructions are stored, which instructions, when read by a processor in a network element, cause the processor to:
receive a packet for forwarding to a destination node, wherein the destination node is reachable via two or more candidate ports of the network element that are connected to respective next-hop network elements;
receive link-level flow-control credit notifications from the next-hop network elements via the respective candidate ports;
select an egress port for the packet from among the candidate ports, based at least on the received link-level flow-control credit notifications, by:
deriving, from the received link-level flow-control credit notifications, numbers of credits that are currently available on the candidate ports;
normalizing the numbers of credits by respective lengths of network links that connect the next-hop network elements to the candidate ports; and
selecting the egress port based at least on the normalized numbers of credits; and
forward the packet toward the destination node over the selected egress port.

* * * * *